US008823798B2

(12) United States Patent
Bernal (10) Patent No.: US 8,823,798 B2
(45) Date of Patent: Sep. 2, 2014

(54) OBSCURING IDENTIFICATION INFORMATION IN AN IMAGE OF A VEHICLE

(75) Inventor: Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 303 days.

(21) Appl. No.: 13/336,850

(22) Filed: Dec. 23, 2011

(65) Prior Publication Data

US 2013/0162817 A1 Jun. 27, 2013

(51) Int. Cl.
*H04N 7/18* (2006.01)
(52) U.S. Cl.
USPC ............................... 348/149; 348/61
(58) Field of Classification Search
None
See application file for complete search history.

(56) References Cited

U.S. PATENT DOCUMENTS

| 6,546,119 | B2 * | 4/2003 | Ciolli et al. | 382/104 |
| 2011/0216179 | A1 * | 9/2011 | Dialameh et al. | 348/62 |

OTHER PUBLICATIONS

Kaushik Deb, et al., "Vehicle License Plate Detection Method Based on Sliding Concentric Windows and Histogram", Journal of Computers, Aug. 2009, pp. 771-777, vol. 4, No. 8, 2009 Academy Publisher.
Paola Campadelli, et al., "Automatic Facial Feature Extraction for Face Recognition", Open Access Database www.i-techonline.com., Face Recognition, pp. 31-58, ISBN 978-3-902613-03-5, I-Tech, Vienna, Austria, Jul. 2007.
Mikael Nilsson, et al., "Face Detection Using Local SMQT Features and Split Up Snow Classifier", Int'l Conf. Acoustics Speech and Signal Proc. (ICASSP), pp. 589-592, ISSN: 1520-6149, Honolulu, HI (Apr. 2007).
K. Somashekar, et al., "Face Detection by SMQT Features and Snow Classifier Using Color Information," International Journal of Engineering Science and Technology, pp. 1266-1272, vol. 3, No. 2, Feb. 2011, ISSN: 0975-5462.
Michael Donoser, et al., "Detecting, Tracking and Recognizing License Plates", Proceedings of the 8th Asian Conference on Computer Vision (ACCV2-07), Part II, LNCS, vol. 4844, pp. 447-456 (2007), Springer-Verlag (2007), ISBN: 978-3-540-76389-5.
Chirag N. Paunwala and Suprava Patnaik, "A Novel Multiple License Plate Extraction Technique for Complex Background in Indian Traffic Conditions", International Journal of Image Processing, pp. 106-118, vol. 4, Issue 2.
Paul Viola and Michael Jones, "Robust Real-Time Object Detection", International Workshop on Statistical and Computational Theories of Vision, pp. 1-25, Vancouver, Canada (Jul. 13, 2001).

* cited by examiner

*Primary Examiner* — Heather Jones
(74) *Attorney, Agent, or Firm* — Philip E. Blair; Fleit Gibbons Gutman Bongini & Bianco P.L.

(57) ABSTRACT

What is disclosed is a system and method for processing an image to obscure information which can be used for identification purposes. In one embodiment, an image is received as part of a traffic enforcement activity. A motor vehicle in the image has a visibly discernible license plate. The vehicle's license plate is first isolated in the image. Content in the image which can be used for identification purposes is thereafter identified. The identified content is compared to the license plate. Any content in the image which is different than the license plate is obscured by, for instance, pixelating the content in the image, introducing a distortion into the image at a location of the content, replacing content with other content, or by blurring the content of the image. The modified image containing the obscured content is then provided to an image output device for rendering. Various embodiments are disclosed.

15 Claims, 8 Drawing Sheets

OBSCURING IDENTIFICATION INFORMATION IN AN IMAGE OF A VEHICLE

TECHNICAL FIELD

The present invention is directed to systems and methods for processing an image of a vehicle such that information in that image which can be used for identification purposes is automatically removed from the image to protect the privacy of individuals whose likeness had been inadvertently captured in that photo.

BACKGROUND

Methods for automatically detecting whether a motor vehicle has incurred a traffic violation such as, for instance, exceeding the posted speed limit, running a red light or passing through a toll collection system without paying the toll, are widely used in various cities and metropolitan areas around the globe. Such systems determine whether a motor vehicle has infracted a traffic law and, if a traffic violation has occurred, a photo or video of that vehicle is captured using a camera system placed at that location so that the vehicle's license plate information is captured in the video or image for later use as evidentiary material in support of related charges or imputations. The license plate number is used to identify the vehicle's registered owner who, in turn, is issued a citation for the traffic violation. In many cases, the visual record of the owner's vehicle at the time of the traffic violation is also provided to the vehicle's registered owner with the citation. However, people whose image had been inadvertently captured in the photo or video of that motor vehicle by having, for example, been standing on a nearby sidewalk at the time the image was taken, have privacy concerns that their image or likeness had been captured without their consent. Such concerns are heightened in those instances when the photo has been provided to the vehicle's owner as part of their traffic citation. This is especially important in the age of the internet (world wide web) where photos can be easily uploaded online for anybody anywhere in the world to view and download.

Accordingly, what is needed in this art are sophisticated systems and methods for processing an image or video captured by an automated camera system during a traffic violation such that content in that visual data which can be used for identification purposes of individuals other than the infractor is automatically removed from the image.

INCORPORATED REFERENCES

The following U.S. Patents, U.S. Patent Applications, and Publications are incorporated herein in their entirety by reference.

"*Detecting, Tracking and Recognizing License Plates*", Michael Donoser, Clemens Arth, and Horst Bischof, Institute for Computer Graphics and Vision, Graz University of Technology, Proceedings of the 8$^{th}$ Asian Conference on Computer Vision (ACCV2-07), Part II, LNCS, Vol. 4844, pp. 447-456, (2007), Springer-Verlag, (2007), ISBN: 978-3-540-76389-5.

"*Automatic Facial Feature Extraction for Face Recognition*", Paola Campadelli, Raffaella Lanzarotti and Giuseppe Lipori, Face Recognition, Publisher: InTech, (July 2007), ISBN 978-3-902613-03-5.

"*Face Detection Using Local SMQT Features And Split Up SNoW Classifier*", by Mikael Nilsson, Jorgen Nordberg, and Ingvar Claesson, Blekinge Inst. of Tech., School of Eng., Ronneby, Sweden, Intl Conf. Acoustics Speech and Signal Proc. (ICASSP), 589-592, ISSN: 1520-6149, Honolulu, Hi. (April 2007).

"*Robust Real-Time Object Detection*", Paul Viola and Michael Jones, 2$^{nd}$ International Workshop on Statistical and Computational Theories of Vision, Vancouver, Canada (July 2001).

BRIEF SUMMARY

What is disclosed is a system and method for processing visual data captured by a camera in a road rule enforcement environment such that content in the recorded photo or video which can be used for identification purposes is removed to protect privacy rights. The teachings hereof identify content which can be used for identification purposes. One embodiment of the present method for obscuring identification information in visual data involves receiving a digital image captured of a motor vehicle during a traffic violation. The vehicle's license plate is isolated in the image or video frames in which it is legible. The image and frames are analyzed to identify content which can be used for identification purposes. The identified content is obscured using, for example, a blurring technique that renders it illegible. A modified image or video containing the obscured content is then provided to an output device. In such a manner, the privacy concerns of persons whose image or likeness had been captured in that image or video are respected.

Features and advantages of the above-described method will become readily apparent from the following detailed description and accompanying drawings.

DETAILED DESCRIPTION

What is disclosed is a system and method for processing visual data captured by a camera system in a road rule enforcement environment such that content in the image or video which can be used for identification purposes of individuals other than infractors is automatically removed from the image. The teachings hereof identify content in the image which can be used for identification purposes. Such content is isolated in the image and then obscured such that the content is no longer visibly discernible.

NON-LIMITING DEFINITIONS

An "image", as used herein, refers to a spatial pattern of light of known colors of the light spectrum which are visible to the human eye. When an image is provided to a memory or storage, the pixels are stored in any of a plurality of formats such as BMP, JPEG, GIF, TIFF, or other formats employed for storing image data. When captured, the image comprises a plurality of pixels.

A "video" is a temporal sequence of a plurality of images.

A "pixel" is the smallest addressable element in an image. Each pixel has its own address. Pixels are normally arranged in a grid. The intensity of each pixel is variable and depends on the characteristics and sensitivity of the camera device being used to capture or measure that pixel. The resolution for a camera depends on the size of the pixel and the number of pixels in the camera sensor. For a given sensor size, smaller pixels mean more of them will fit into the captured image, thus giving it better definition. Received pixels of an image of a motor vehicle are associated with a color value defined in terms of a color space, intensity, lightness, brightness, or some mathematical transform thereof. Pixel values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

A "motor vehicle" means a motorized vehicle which is licensed or registered to operate on public roadways. Licensed vehicles have at least one license plate fixed to either a front or rear portion of the vehicle, depending on the motor vehicle laws of that particular jurisdiction. The license plate contains a unique identifier associated with that particular vehicle and the vehicle's registered owner.

Figure 1:
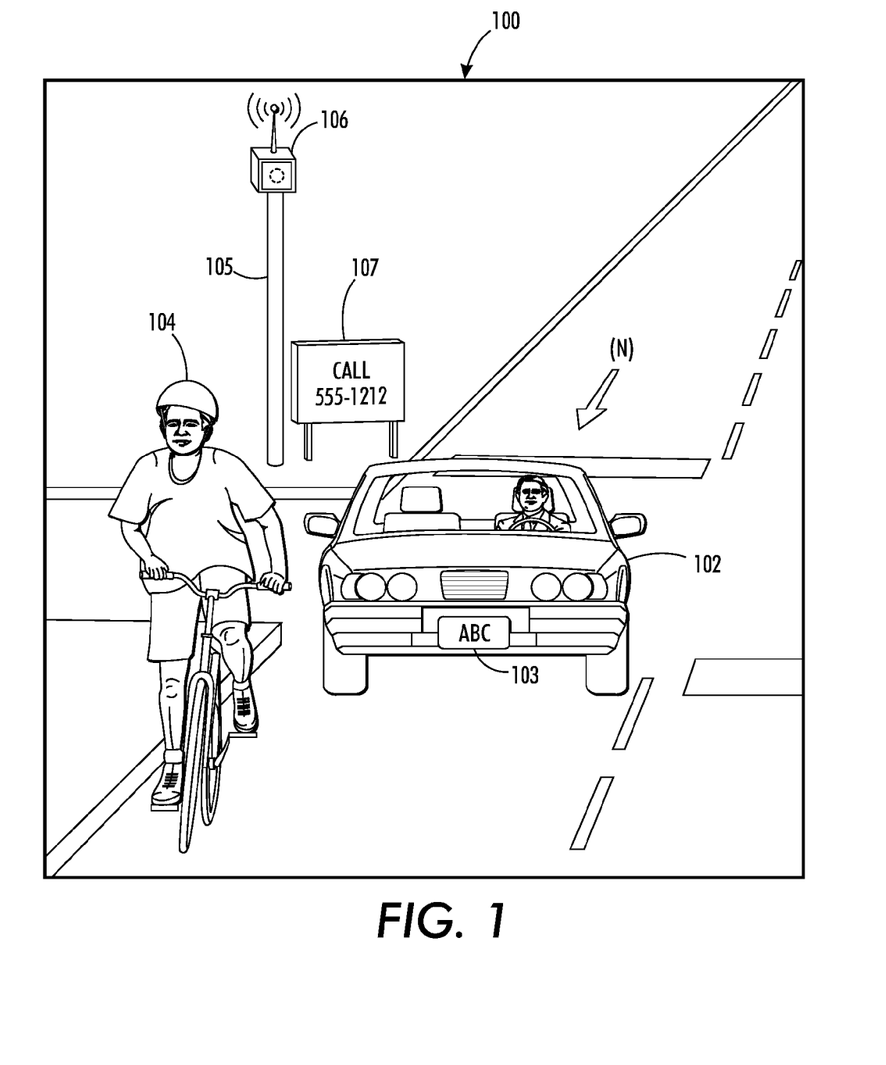
FIG. 1 illustrates an example image of a motor vehicle captured during a traffic violation along with a bicycle rider whose image was inadvertently captured in that photo.

A "traffic camera system" means a camera system for capturing an image or video of a motor vehicle in a road-rule enforcement environment. Such a camera system may be a conventional camera for capturing visual data in a standard format such as, for instance RGB, or can be an infrared (IR) camera for capturing infrared images at night. An IR camera is an apparatus designed to capture IR light, separate it into its component wavelengths, and output an IR image. The traffic camera system can also be a hyperspectral camera for capturing a hyperspectral image. Hyperspectral camera systems provide sampled information across different wavelength ranges or bands of the electromagnetic spectrum for each pixel in an image. FIG. 1 shows an example image of a motor vehicle 102 and license plate 103 captured by a traffic camera 106 mounted on support arm 105. An example traffic camera system is discussed with respect to FIG. 2 and further with respect to the block diagram of FIG. 6. Factors which pose difficulty for traffic camera systems include the speed of the vehicles being recorded, varying ambient lighting conditions, headlight glare, plate reflectivity, and environmental conditions such as rain, snow, sleet, fog, and the like.

"Content for identification purposes" refers to any content which can be used to identify a person, place, or business which one would reasonably want protected for privacy concerns. Identification content includes: names, addresses, phone numbers, account numbers, email addresses, an image of a person, a likeness of a person, other license plate numbers, and the like. Various methods exist for identifying content contained within an image such as text detection algorithms for identifying alphanumeric text, and facial detection algorithms for identifying persons in the image. Facial feature extraction is a well-established technique in the image processing arts for processing an image to isolate facial features for subsequent identification. Such methods are typically used in conjunction with a content-based image retrieval (CBIR) system. Content-based means that the search is based on content contained in the photo rather than metadata such as, for example, keywords, tags, descriptors associated with the image, and the like, associated with that photo. Example algorithms for text and face detection have been incorporated herein by reference.

"License plate identification" is used in automatic number plate recognition (ANPR) systems by road-rule enforcement systems to automatically extract a license plate number from an image of a motor vehicle. ANPR technology tends to be region-specific owing to variations of plate size, location, and the like, from region to region. Algorithms for fast and accurate detection and extraction of license plate numbers from photos are readily available. Example algorithms for license plate detection have been incorporated herein by reference.

An "image output device" is any device capable of reducing image or video data to a viewable form. Example image output devices includes photographic reproduction equipment, monitors and display devices, document reproduction devices, fax machines, handheld devices such as a cellular device or an ipad, and other devices capable of displaying an image.

"Outputting visual data" means communicating or storing visual data to a memory or storage device for subsequent retrieval and/or communicating visual data to another device over a communication pathway such as a network by transmitting a signal of the visual data.

"Obscuring content in an image" means modifying content in the image or video frame such that the content is no longer visibly discernible and preferably not recoverable by techniques which reverse or undo the blurring effect. Methods for obscuring content in a digital image are well established in the image processing arts and include techniques such as, for instance, pixelating the image content, introducing a distortion into the image at a location of that content, blurring the image content, replacing the content with other content, and like methods. One of ordinary skill would be familiar with mathematical techniques and functions which perform a blurring operation on a digital image, or portions thereof, by modifying pixel values of the image such that the content displayed thereon is rendered no longer visibly legible. In accordance with the teachings hereof, content in the image can be obscured by pixelating the content, introducing a distortion into the image at a location of the content intended to be obscured, replacing that content with other content, or performing blurring on the content. Gaussian, Butterworth, weighted averaging and other low-pass filters are often used for blurring image content.

Example Intersection with Traffic Camera

Figure 2:
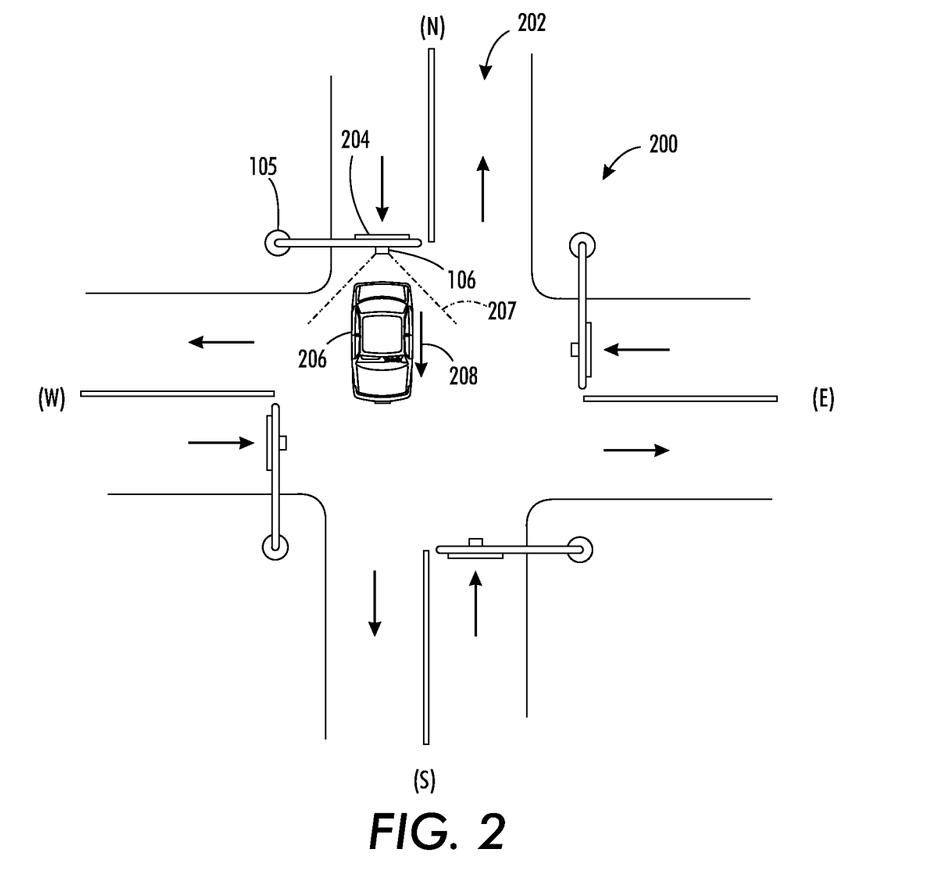
FIG. 2 illustrates an example 4-way intersection with a video capturing system for capturing a video sequence of a motor vehicle during a traffic violation, such as the image of FIG. 1.

Reference is now being made to FIG. 2 which illustrates an example 4-way intersection with a camera for capturing an image of a motor vehicle during a traffic violation, such as the image of FIG. 1.

The 4-way intersection 200 has a lane at the northern end (N) of the intersection, and lanes at each of the east side (E), south side (S), and west side (W) of the intersection. For purpose hereof, items shown and discussed with respect to the north side 202 equally apply to each of the other lanes. Each of the lanes is shown with arrows to indicate the direction of vehicular travel. Traffic coming from the north side of the intersection in a southbound direction will encounter traffic light 204 shown being supported above the lane of travel by support arm 105. The travel of vehicles in each of the lanes entering the intersection is regulated by each lane's traffic light. Affixed to each of the support arms is traffic camera 106 which, in this embodiment, has a field of view 207 facing the intersection to capture images of motor vehicles, such as vehicle 206, running a red light traveling in the direction of arrow 208. Camera 106 is rotatably fixed to support arm 105 such that the camera's field of view can be directed in any of a plurality of directions. Camera 106 may be remotely controllable by an operator. The embodiment of FIG. 2 is not to be viewed as limiting the scope of the appended claims.

Example Flow Diagram

Figure 4:
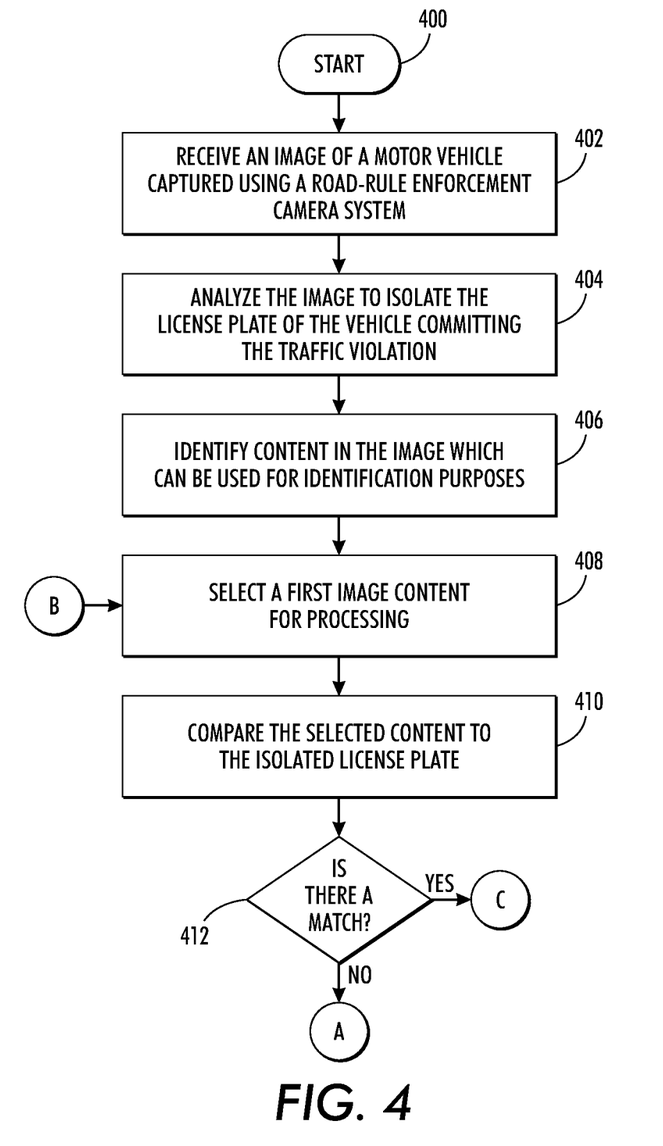
FIG. 4 is a flow diagram of one example embodiment of the present method for processing an image to obscure information which can be used for identification purposes.

Reference is now being made to the flow diagram of FIG. 4 which illustrates one example embodiment of the present method for processing an image to obscure information which can be used for identification purposes. Flow processing begins at 400 and immediately proceeds to step 402.

At step 402, an image is received of a motor vehicle captured in response to a traffic violation having occurred. Alternatively, a video is received and processed accordingly. The image has been captured using a camera system engaging in road-rule enforcement activities on a traffic lane of an intersection. The received image contains, at least in part, a motor vehicle having a license plate. One example image of a motor vehicle with a visibly discernible license plate is shown and discussed with respect to the image of FIG. 1.

At step 404, the vehicle's license plate is isolated in the image. The license plate 103 of FIG. 1 is shown isolated at 302 of FIG. 3. The motor vehicle has committed a traffic violation which triggered the camera to capture that vehicle's image.

Figure 3:
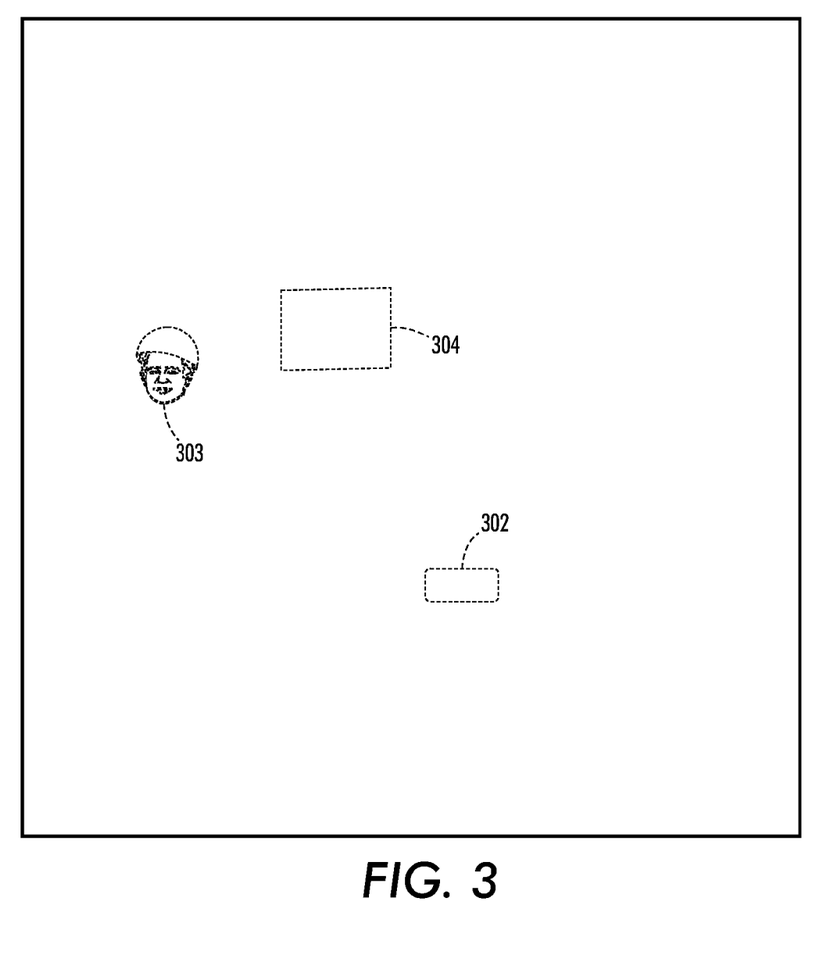
FIG. 3 shows the image of FIG. 1 wherein the head/facial region of bicyclist 104, license plate 103 of motor vehicle 102, and sign 107 have been isolated.

At step 406, the received image is processed to identify content in the image which can be used for identification purposes. FIG. 3 shows the identified content of FIG. 1 at 303 and 304. Content 303 has been identified in the image using a facial feature identification and extraction algorithm. Content 304 has been identified in the image via a text detection method.

At step 408, a first content which can be used for identification purposes is identified or otherwise selected for processing. Content may be processed automatically or may be selected by a user using, for example, the graphical user interfaced of computer workstation 620 of FIG. 6. Content may be sequentially processed in the order in which they were identified or in an alternative order as determined by, for example, an operator of the present system.

At step 410, the content is compared to the license plate which was isolated in the image in step 404. The comparison can be performed on the extracted alphanumeric license plate number or on the image portion containing the license plate. Methods for comparing alphanumeric text are well established. Methods for comparing two images or image portions vary. One method performs a pixel-by-pixel comparison of the two images to determine whether the two are the same or are substantially the same to within a predetermined threshold value.

At step 412, a determination is made whether, as a result of the comparison of step 410, the selected content matches the isolated license plate (of step 404). This step is performed such that the license plate number that matches that belonging to the violator is kept separate from the other identified content so that the resulting modified image retains the infractor's license plate after all the other image content has been obscured. If not, then processing continues with respect to node A of FIG. 5 wherein, at step 414, the image content is extracted and obscured using, for example, a blurring function as discussed herein, such that the content is no longer visibly discernible. In this embodiment, blurred content is stored to storage device 317 for subsequent retrieval. If, at step 412, the image content matches the isolated license plate then processing continues with respect to node C. Once the image content has been obscured, at step 416, a determination is made whether any more image content, identified (and extracted) in step 406 from the captured image, remains to be processed. If so, processing continues with respect to node B wherein, at step 408, a next image content is selected or otherwise identified for processing and processing repeats in a similar manner until all image content which can be used for identification purposes has been processed accordingly.

Figure 5:
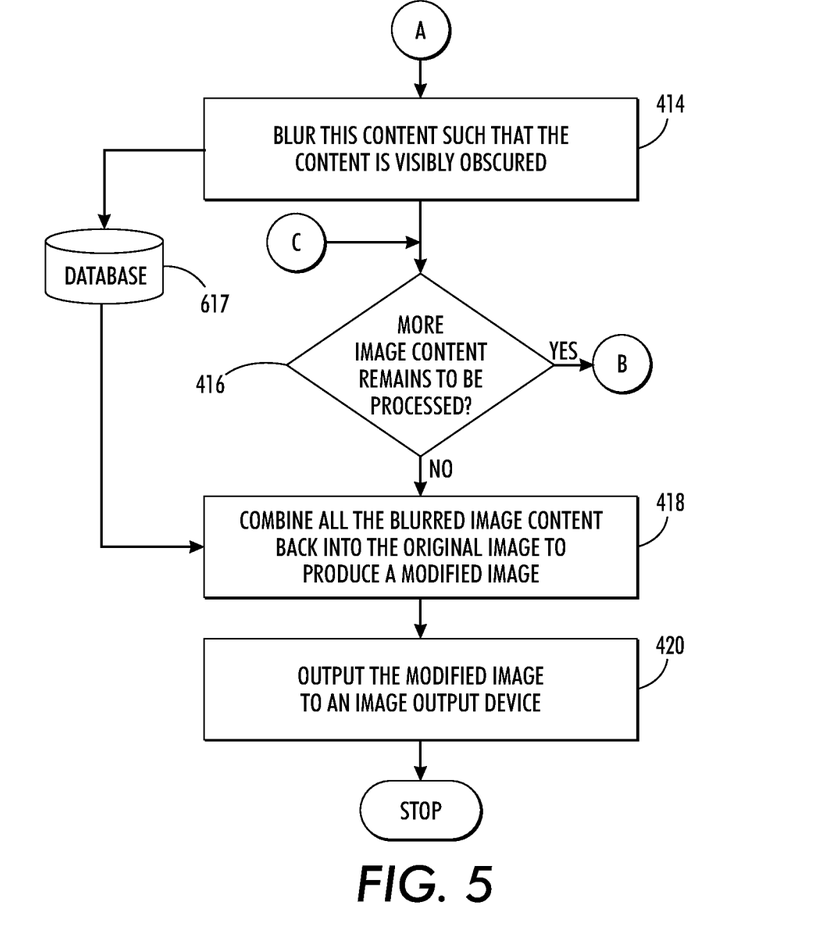
FIG. 5 is a continuation of the flow diagram of FIG. 4 with flow processing continuing with respect to node A.
Figure 6:
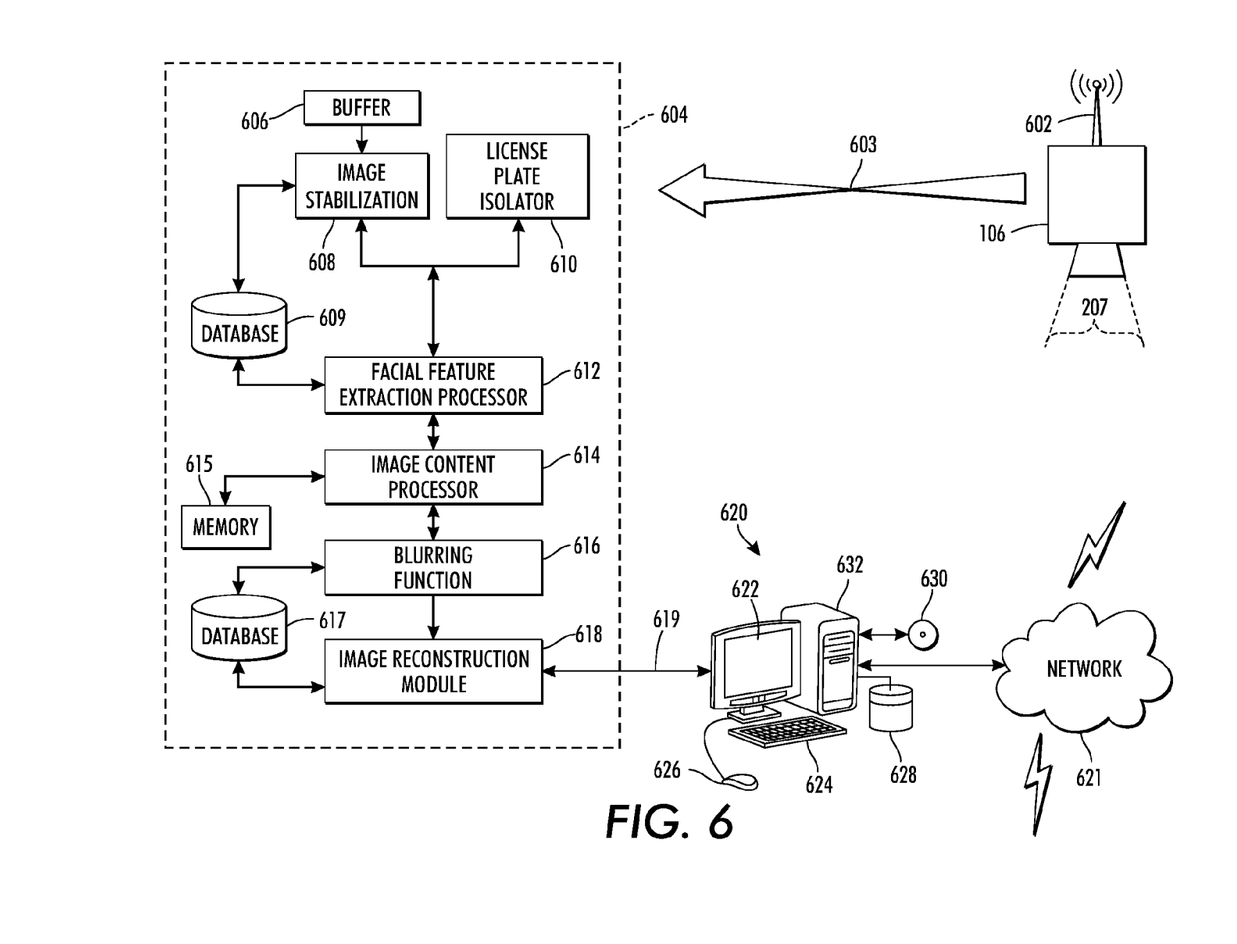
FIG. 6 is a functional block diagram of one example embodiment of the image capture device of FIG. 2 and an image processing system for implementing various aspects of the present method as shown and described with respect to the flow diagrams of FIGS. 4 and 5.
Figure 7:
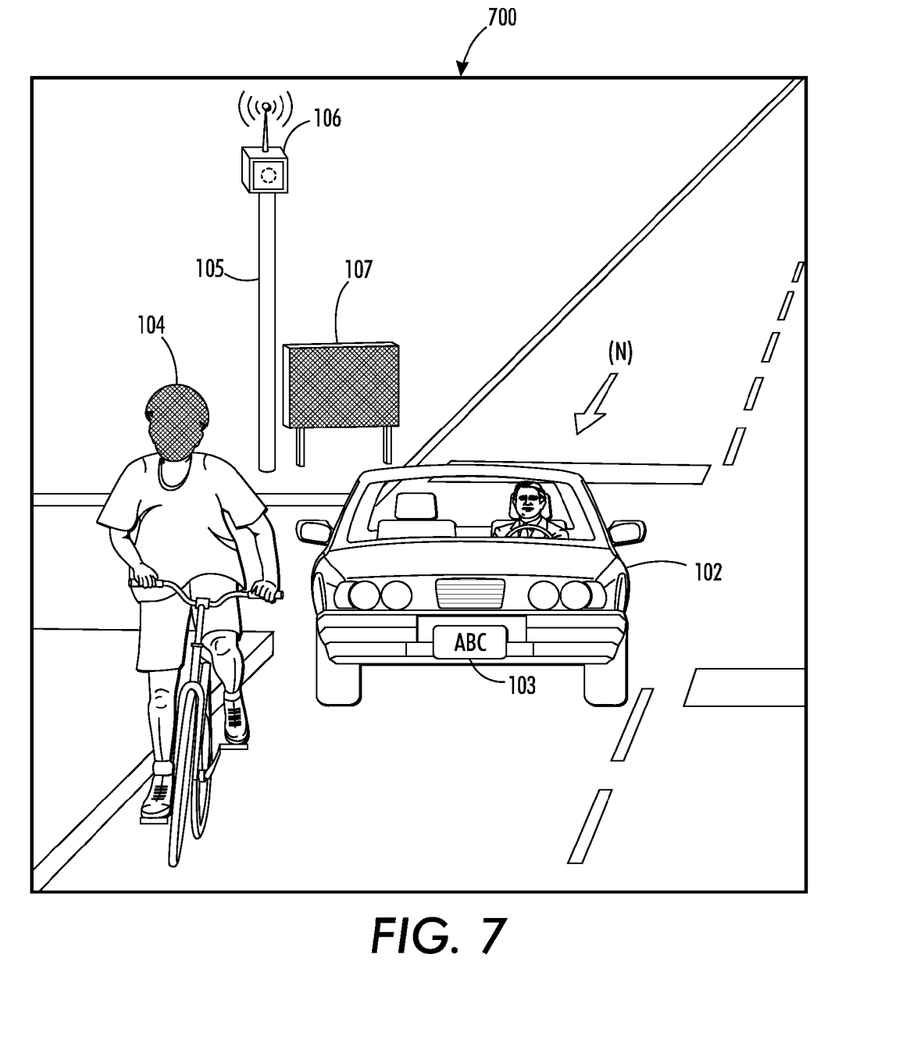
FIG. 7 shows the image of FIG. 1 having been processed in accordance with the teachings hereof wherein image content which can be used for identification purposes has been blurred by a blur function.

At step 418, the obscured image or frame portions are retrieved from storage device 617 of FIG. 6 and combined back into the original image or video to produce a modified visual content. Pixels of the original image or frame at locations of each of the image content which has been identified as containing information which can be used for identification purposes are replaced, on a pixel-by-pixel basis, with pixels of each respective obscured content. The obscured content which was stored to device 617 has retained its shape and dimensions such that the obscured content can be overlaid onto the image back at its original location in the image. Alternatively, image content portions are obscured directly in the original image and not extracted for blurring, in which case, step 418 would not be performed because the blurred content is not extracted, obscured, then stored for subsequent retrieval. FIG. 7 shows image 700 wherein the identified contents 303 and 304 of FIG. 3 have been obscured by a blur function (shown by way of example as cross-hatching) and combined back into the original image 100 of FIG. 1.

At step 420, the modified image is provided to an image output device such as, for example, a color marking or display device wherein the modified digital image is rendered. Thereafter, in this embodiment, processing stops.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine readable program instructions.

Example Image Processing System

Reference is now being made to FIG. 6 which illustrates a functional block diagram of one example embodiment of the image capture device of FIG. 2 and an image processing system wherein various aspects of the present method as shown and described with respect to the flow diagrams of FIGS. 4 and 5, are implemented.

In FIG. 6, camera 106 captures one or more images (collectively at 603), such as image 100 of FIG. 1, of vehicles during a road-rule enforcement activity at the example intersection of FIG. 2. In one embodiment, camera 106 captures multi-channel source data such as RGB or multi-spectral data over time. Camera 106 has one or more imaging sensors which may be a single sensor or a sensor array including a plurality of individual or separate sensor units. Captured images 603 are communicated via communication device 602 to image processing system 604.

Image processing system 604 is shown comprising a buffer 606 for queuing the received images 603 for processing. Image Stabilizer 608 is provided for those camera systems where undesired effects from either motion of the camera or movement of the subject needs to be compensated for using, for example, image segmentation and/or point feature tracking techniques. Such techniques are well known in the image processing arts. Stabilization Module 608 is in communication with Device 609 which stores data, variables, values, mathematical formulas, and other representations as are necessary to process the images according to the teachings hereof. License Plate Isolator 610 receives the images and isolates the plate number of the vehicle which committed a traffic violation. Module 610 employs any of a variety of license plate identification techniques known in the arts to isolate license plate 103 of motor vehicle 102 in the captured image of FIG. 1 such as license plate localization, license plate extraction and ANPR. Plate 103 has been isolated 302 in the image of FIG. 3. Facial Feature Extraction Module 612 processes the image using a facial feature detection and extraction technique to isolate regions in the image containing a head/face of individuals whose image or likeness was also captured in the photo. Features of individuals may be identified both inside and outside of vehicles in the image including the individuals in the vehicle which committed the traffic violation. The head/face of bicyclist 104 has been identified 303 in the image of FIG. 3. Image Content Processor 614 processes the image for other content which can be used, in accordance herewith, for identification purposes. Such content includes, for example, names, addresses, phone numbers, email addresses, other license plates, and the like, which may have also been captured in the image. Processor 614 employs any of a wide variety of image content identification techniques such as, for instance, text detection and extraction algorithms, to detect alphanumeric text in the image which may be, for example, on a billboard or a storefront, or an advertisement on the side of a truck or van, which have been determined to comprise content which can be used for identification purposes, as defined herein. Processor 614 has isolated the region of the image containing sign 107 of FIG. 1 as shown at 304 in FIG. 3. Processor 614 is in communication with Memory 615 which is utilized to store machine readable program instructions, data and variables, as are needed to implement any of the functionality of image content processing. The isolated portions of the captured image are then provided to Blurring Function 616 which, in one embodiment, performs a Gaussian blurring on identified regions of the image such as region 303 and 304 of FIG. 3, to blur these portions of the image such that these are no longer visibly or otherwise discernible. Depending on the embodiment implemented, the image portions are extracted from the image and stored to Storage Device 617. Image Reconstruction Module 618 retrieves the blurred image portions and combines those portions with the original image 603 to produce a modified image 619 which is output to the display 622 of workstation 620. Alternatively, the blurring is performed directly on the original image without having been first extracted from the image. In this case, Module 618 would not be needed to reconstruct the image as a modified image would necessarily result after the Blurring Function 616 had completed performance of its intended function directly on the original image.

The networked system of FIG. 6 is shown comprising a workstation 620. Computer case 632 houses a motherboard with a processor and memory, a communications link such as a network card, video card, and other software and hardware needed to perform the functionality of a computing system. Case 632 further houses a hard drive (internal to case 632) which reads/writes to a machine readable media 630 such as a floppy disk, optical disk, CD-ROM, DVC, magnetic tape, etc. Workstation 620 further includes a graphical user interface comprising a display device 622, such as a CRT, LCD, or touchscreen device, for displaying information and a keyboard 624 and mouse 626 for effectuating a user input or selection. Workstation 620 has an operating system and other specialized software configured to display alphanumeric values, menus, scroll bars, dials, slideable bars, pull-down options, selectable buttons, and the like, for entering, selecting, modifying, and accepting any information needed for processing the image. Software to configure a user interface or any portion thereof to display/enter/accept data is generally customizable. Default settings and initialization parameters can be retrieved from storage device 628, as needed. Although shown as a desktop computer, it should be appreciated that workstation 620 can be a laptop, a mainframe, a client/server, or a special purpose computer such as an ASIC, circuit board, dedicated processor, or the like. The embodiment of the workstation of FIG. 6 is illustrative and may include other functionality known in the arts. All or portions of the images captured by camera 106 may be stored in Memory 615 and/or Storage Device 609 or may be communicated to Workstation 620. Any of the system components of the networked workstation 620 may be placed in communication with image processing system 604 and/or camera 106 such that images obtained thereby can be viewed on the monitor display wherein a user can select image content thereof which can be used for identification purposes. A user or technician of the system of FIG. 6 may use the graphical user interface of workstation 620 to identify regions of interest, set parameters, use a rubber-band box to select pixels, frames, images, and/or regions of images for processing. These selections may be stored and retrieved from storage medium 628 or computer readable media 630. Information stored to media 630 can be retrieved by a media reader such as, for example, a CD-ROM drive, located inside of computer case 632.

Any of the modules and processing units of FIG. 6 can be placed in communication with storage device 628 and may store/retrieve therefrom data, variables, records, parameters, functions, machine readable/executable program instructions required to perform their intended functions. Each of the modules of system 604 may be placed in communication with one or more devices over network 621. It should be appreciated that some or all of the functionality performed by any of the modules or processing units of system 604 can be performed, in whole or in part, by workstation 620 or by a workstation in communication with system 604 over network 621.

It should be appreciated that any of the modules and/or processors of FIG. 6 are in communication with workstation 620 and with storage devices 609, 615, and 628 via communication pathways (shown and not shown) and may store/retrieve data, parameter values, functions, pages, records, data, and machine readable/executable program instructions required to perform their various functions. Connections between modules are both physical and logical. A plurality of modules may perform a single function. A plurality of modules may be executed by either a single special purpose computer system or a plurality of systems operating in parallel.

Modules may include software/hardware modules which may comprise an operating system, drivers, controllers, and other apparatuses, some or all of which may be connected via a network. A module may comprise a single piece of hardware such as an ASIC, electronic circuit, or special purpose processor. Various modules and processing units described with respect to the system of FIG. 6 may designate one or more components which may, in turn, comprise software and/or hardware or a special purpose computer system such as that described with respect to FIG. 8 having been designed to perform the functionality of the teachings hereof.

Example Special Purpose Computer

Figure 8:
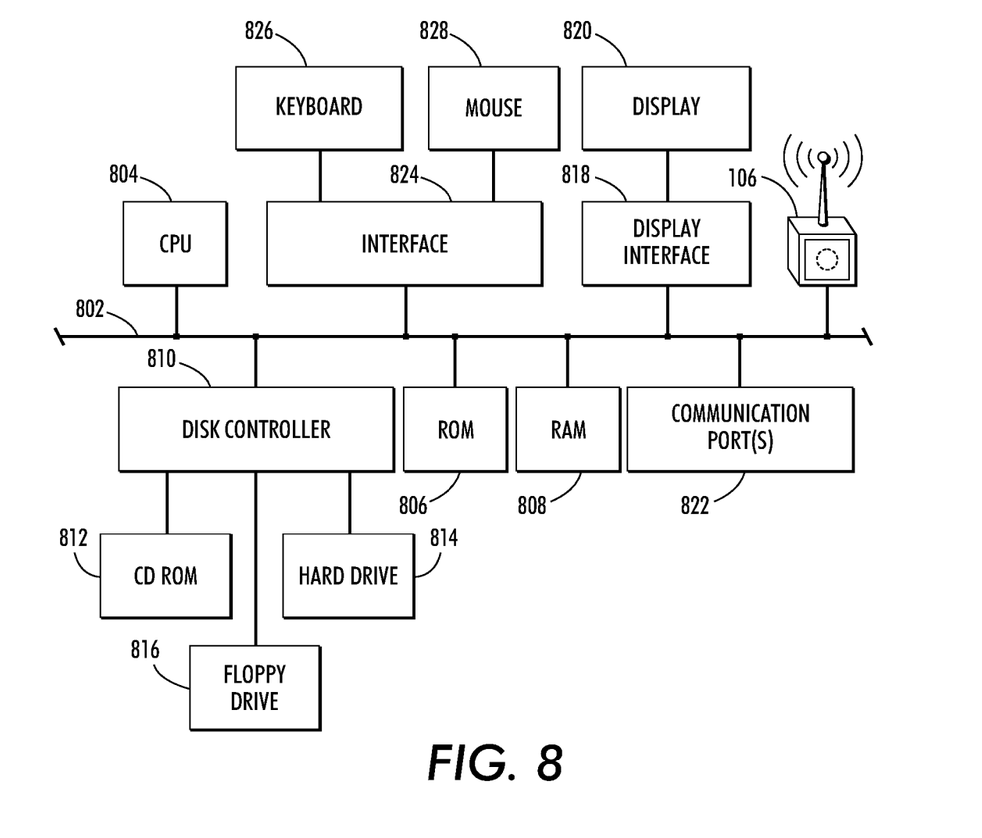
FIG. 8 illustrates a block diagram of one example special purpose computer for implementing one or more aspects of the present method as described with respect to the flow diagrams hereof and the various modules and processing units of the block diagram of FIG. 6.

Reference is now being made to FIG. 8 which illustrates a block diagram of one example embodiment of a special purpose computer system for performing one or more aspects of the present method.

The special purpose computer of FIG. 8 is shown comprising a communications bus 802 which serves as an information highway interconnecting the other illustrated components. Central processing unit (CPU) 804 is capable of executing machine readable program instructions for performing any of the calculations, comparisons, logical operations, and other program instructions for performing any of the steps described above with respect to the flow diagrams and illustrated embodiments hereof. Processor 804 is in communication with memory (ROM) 806 and memory (RAM) 808 which, collectively, constitute example storage devices. Such memory may be used to store machine readable program instructions and other program data and results to sufficient to carry out any of the functionality described herein with respect to the flow diagrams hereof. Disk controller 810 interfaces with one or more storage devices 814. These storage devices may comprise external memory, zip drives, flash memory, USB drives, or other devices such as CD-ROM drive 812 and floppy drive 816. Storage device 814 may store machine executable program instructions for executing the methods hereof. Such storage devices may be used to implement a database wherein various records are stored. Display interface 818 effectuates the display of information on display 820 in various formats such as, for instance, audio, graphic, text, and the like. Interface 824 effectuates a communication via keyboard 826 and mouse 828, collectively a graphical user interface. Such a graphical user interface is useful for a user to enter information about any of the displayed information in accordance with various embodiments hereof.

Communication with external devices may occur using example communication port(s) 822. Such ports may be placed in communication with any of the example networks shown and described herein, such as the Internet or an intranet, either by direct (wired) link or wireless link, as shown and discussed with respect to the networked configuration of FIG. 6. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated one or more aspects of the present method are intended to be incorporated in an article of manufacture, including one or more computer program products. The article of manufacture may be included on a storage device that is readable by a compatible machine architecture capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, image processing system, operating system, software program, plug-in, DLL, or a storage device.

The methods hereof can be implemented as a routine embedded on a personal computer or as a resource residing on a server or workstation, such as a routine embedded in a plug-in. The methods provided herein may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for processing an image to obscure information which can be used for identification purposes, the method comprising:
   receiving an image containing at least a motor vehicle driven by a driver, said image being captured in response to a traffic violation having occurred;
   isolating a license plate of said motor vehicle in said image;
   isolating said driver of said motor vehicle in said image;
   identifying other content in said image which is not said isolated license plate and which is not said isolated driver that can be used for identification purposes of third parties in said image;
   obscuring said identified other content in said image which is different than said isolated license plate and said isolated driver to obtain a modified image; and
   outputting said modified image to an image output device.

2. The method of claim 1, wherein identifying content in said image which can be used for identification purposes comprises any of: a face detection algorithm, a license plate detection algorithm, and a text detection algorithm.

3. The method of claim 1, wherein obscuring content comprises any of:
   blurring said content using one of: a Gaussian, Butterworth, and weighted averaging blur filter;
   pixelating said content in said image;
   extracting said content from said image;

introducing a distortion into said image at a location of said content; and replacing said content with other content.

4. The method of claim 1, wherein said content comprises any of: names, addresses, phone numbers, account numbers, email addresses, an image of a person, a likeness of a person, and other license plate numbers.

5. The method of claim 1, wherein outputting said modified image to said image output device comprises providing said modified image to any of: a color marking device a display device, a fax machine, a workstation, a storage device, a cellular device, and a remote device over a network.

6. A system for processing an image to obscure information which can be used for identification purposes, the system comprising:

a camera system; and a processor in communication with said camera system and a memory, said processor executing machine readable instructions for performing:

receiving an image containing at least a motor vehicle, said image being captured by said camera system in response to a traffic violation having occurred;

isolating a license plate of said motor vehicle in said image;

isolating said driver of said motor vehicle in said image;

identifying other content in said image which is not said isolated license plate and which is not said isolated driver that can be used for identification purposes of third parties in said image;

obscuring said identified other content in said image which is different than said isolated license plate and said isolated driver to obtain a modified image; and outputting said modified image to an image output device.

7. The system of claim 6, wherein identifying content in said image which can be used for identification purposes comprises any of: a face detection algorithm, a license plate detection algorithm, and a text extraction algorithm.

8. The system of claim 6, wherein obscuring content comprises any of:

blurring said content using one of: a Gaussian, Butterworth, and weighted averaging blur filter;

pixelating said content in said image;

extracting said content from said image;

introducing a distortion into said image at a location of said content; and replacing said content with other content.

9. The system of claim 6, wherein said content comprises any of: names, addresses, phone numbers, account numbers, email addresses, an image of a person, a likeness of a person, and other license plate numbers.

10. The system of claim 6, wherein outputting said modified image to said image output device comprises providing said modified image to any of: a color marking device a display device, a fax machine, a workstation, a storage device, a cellular device, and a remote device over a network.

11. A computer implemented method for processing an image to obscure information which can be used for identification purposes, the method comprising:

receiving an image containing at least a motor vehicle driven by a driver, said image being captured in response to a traffic violation having occurred;

isolating a license plate of said motor vehicle in said image;

isolating said driver of said motor vehicle in said image;

identifying other content in said image which is not said isolated license plate and which is not said isolated driver that can be used for identification purposes of third parties in said image;

obscuring said identified other content in said image which is different than said isolated license plate and said isolated driver to obtain a modified image; and outputting said modified image to an image output device.

12. The computer implemented method of claim 11, wherein identifying content in said image which can be used for identification purposes comprises any of: a face detection algorithm, a license plate detection algorithm, and a text detection algorithm.

13. The computer implemented method of claim 11, wherein obscuring content comprises any of:

blurring said content using one of: a Gaussian, Butterworth, and weighted averaging blur filter;

pixelating said content in said image;

extracting said content from said image;

introducing a distortion into said image at a location of said content; and replacing said content with other content.

14. The computer implemented method of claim 11, wherein said content comprises any of: names, addresses, phone numbers, account numbers, email addresses, an image of a person, a likeness of a person, and other license plate numbers.

15. The computer implemented method of claim 11, wherein outputting said modified image to said image output device comprises providing said modified image to any of: a color marking device a display device, a fax machine, a workstation, a storage device, a cellular device, and a remote device over a network.

\* \* \* \* \*